US010111086B2

(12) United States Patent
Hjelt

(10) Patent No.: US 10,111,086 B2
(45) Date of Patent: Oct. 23, 2018

(54) METHODS AND APPARATUSES FOR ACTIVATING A MOBILE SUBSCRIPTION

(71) Applicant: Telia Company AB, Solna (SE)

(72) Inventor: Björn Hjelt, Espoo (FI)

(73) Assignee: Telia Company AB (SE)

(*) Notice: Subject to any disclaimer, the term of this patent is extended or adjusted under 35 U.S.C. 154(b) by 0 days.

(21) Appl. No.: 15/848,802

(22) Filed: Dec. 20, 2017

(65) Prior Publication Data

US 2018/0176767 A1    Jun. 21, 2018

(30) Foreign Application Priority Data

Dec. 20, 2016  (SE) ...................................... 1651695

(51) Int. Cl.
| | | |
|---|---|---|
| H04W 4/00 | (2018.01) | |
| H04W 8/18 | (2009.01) | |
| H04M 15/00 | (2006.01) | |
| H04W 8/20 | (2009.01) | |
| H04W 12/04 | (2009.01) | |
| H04M 17/00 | (2006.01) | |
| H04M 17/02 | (2006.01) | |

(52) U.S. Cl.
CPC ........... *H04W 8/183* (2013.01); *H04M 15/49* (2013.01); *H04M 15/8011* (2013.01); *H04W 8/205* (2013.01); *H04W 12/04* (2013.01); *H04M 17/026* (2013.01); *H04M 17/103* (2013.01)

(58) Field of Classification Search
USPC .................................................... 455/435.1
See application file for complete search history.

(56) References Cited

U.S. PATENT DOCUMENTS

| | | | |
|---|---|---|---|
| 9,451,098 B2 | 9/2016 | Zhu et al. | |
| 9,510,181 B2 | 11/2016 | Barton et al. | |
| 9,781,094 B2 * | 10/2017 | Shahidi | H04L 63/08 |
| 2015/0111573 A1 | 4/2015 | Barton et al. | |
| 2015/0304506 A1 | 10/2015 | Zhu et al. | |
| 2017/0230820 A1 * | 8/2017 | Ho | H04B 1/3816 |
| 2018/0132289 A1 * | 5/2018 | Zhao | H04W 60/005 |

FOREIGN PATENT DOCUMENTS

| | | | | |
|---|---|---|---|---|
| NL | EP 2887717 A1 * | 6/2015 | ............ | H04W 12/06 |
| WO | WO 2013085852 A1 * | 6/2013 | ............. | H04W 8/04 |

* cited by examiner

*Primary Examiner* — David Q Nguyen
(74) *Attorney, Agent, or Firm* — Burr & Forman LLP; Jeffrey H. Kamenetsky

(57) ABSTRACT

The embodiments herein relate to methods and apparatuses for mobile activation of a subscription. According to an embodiment, a method includes: receiving an identification information from a mobile device; allocating based on the received identification information a SIM profile from a pool of SIM profiles; transmitting the allocated SIM profile to the mobile device; the SIM profile including at least an IMSI and associated network keys; establishing a connection with the mobile device, wherein the connection is restricted until the IMSI has been associated to a subscription; and activating the mobile subscription for the given IMSI based on associated data or based on the IMSI relating to said subscription. The embodiments are relate to a network node, a mobile device and a method thereof.

14 Claims, 8 Drawing Sheets

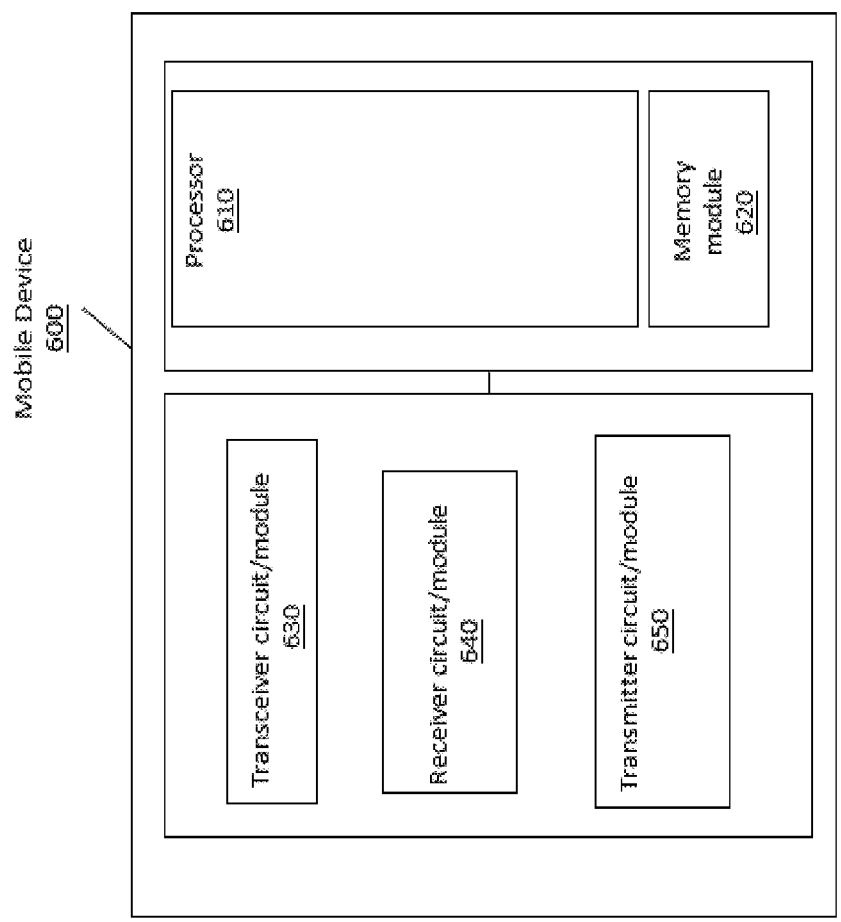

METHODS AND APPARATUSES FOR ACTIVATING A MOBILE SUBSCRIPTION

TECHNICAL FIELD

The present disclosure relates to the field of wireless communications, and in particular to methods and apparatuses for activating a mobile subscription for a mobile device.

BACKGROUND

A subscriber identity module (SIM) is a integrity circuit card that stores a lot of information including the international mobile subscriber identity (IMSI), related key(s) used to identify and authenticate a subscriber (such as a mobile device or a computer). A SIM is also known as a universal integrated circuit card (UICC).

Embedded programmable SIM cards (eSIM) are coming into focus as a means for remote activation of mobile devices/subscriptions and other uses. An example of how activation of a user mobile subscription is performed over the air (OTA) using eSIM will now be described. In this case, as today, customer identification, and payment is setup in the store at a point of sale (PoS) or via an online internet channel. A specific subscription is linked to a SIM profile. The SIM identification (ID) information is to be provided to the operator. For example, the SIM ID from the box including the mobile device may be scanned, or the eSIM ID may be extracted from the SIM menu in the mobile device etc. When the operator receives the SIM ID, a profile is pushed to the mobile device. The user may then be requested to install and activate a program or application of the operator. After installation the mobile device or subscription is activated. In case the user desires to have an additional subscription with another operator, the same procedure as described above may be performed. In this case, the user will have to manually select between the profiles provided by the respective operators.

SUMMARY

It is an object of embodiments herein to provide methods ad apparatuses for achieving an improved activation process of a mobile subscription.

According to an aspect of embodiments herein, there is provided a method performed by network node, such as a server of an network operator, the method comprising: receiving, at a network node, identification information from the mobile device; allocating, based on the received identification information, a subscriber identity module, SIM, profile from a pool of SIM profiles managed by the network node or a profile provider; transmitting the allocated SIM profile to the mobile device; the SIM profile including at least an international mobile subscriber identity, IMSI and network keys; establishing a connection with the mobile device, wherein the connection is restricted until the IMSI has been associated to a subscription; and activating the mobile subscription based on associated data or based on IMSI relating to said subscription.

According to another aspect of embodiments herein, there is provided a method performed by a mobile terminal for activating a mobile subscription, the method comprising: transmitting to a network node (e.g. server of a network operator), identification information; receiving, based on the identification information, a SIM profile allocated by the network device or a profile provider, the SIM profile including at least an international mobile subscriber identity, IMSI and network keys; connecting to at least one activation site of the network node using a connection established by the network node, wherein the connection is restricted until the IMSI has been associated to a subscription; and transmitting data to the network node for activation of the mobile for the given IMSI based on associated data or based on the IMSI relating to said subscription.

According to another aspect of embodiments herein, there is provided a method performed by a network node or server of an operator, for activating a mobile subscription, the network node comprising a processor and a memory, said memory containing instructions executable by said processor whereby said network node is operative to: receive identification information from the mobile device; allocate, based on the received identification information, a subscriber identity module, SIM, profile from a pool of SIM profiles managed by the network node or a profile provider; transmit the allocated SIM profile to the mobile device; the SIM profile including at least an international mobile subscriber identity, IMSI and network keys; establish a connection with the mobile device, wherein the connection is restricted until the IMSI has been associated to a subscription; and activate the mobile subscription based on associated data or based on IMSI relating to said subscription.

According to another aspect of embodiments herein, there is provided a mobile device for activating a mobile subscription, the mobile device comprising a processor and a memory, said memory containing instructions executable by said processor whereby said mobile device is operative to: transmit to a network node (e.g. server of a network operator), identification information; receive, based on the identification information, a SIM profile allocated by the network device or a profile provider, the SIM profile including at least an international mobile subscriber identity, IMSI and network keys; connect to at least one activation site of the network node using a connection establish by the network node, wherein the connection is restricted until the IMSI has been associated to a subscription; and transmit data to the network node for activation of the mobile subscription for the given IMSI based on associated data or based on the IMSI relating to said subscription.

There is also provided a computer program comprising instructions which when executed on at least one processor of the network node according to anyone of claims 8-12, cause the at least said one processor to carry out the method according to anyone claims 1-5.

Also, a carrier containing the computer program of is provided, wherein the carrier is one of a computer readable storage medium; an electronic signal, optical signal or a radio signal.

There is also provided a computer program comprising instructions which when executed on at least one processor of the mobile device according to anyone of claims 6-7, cause the at least said one processor to carry out the method according to anyone of claims 13-16.

Also, a carrier containing the computer program of is provided, wherein the carrier is one of a computer readable storage medium; an electronic signal, optical signal or a radio signal.

BRIEF DESCRIPTION OF THE DRAWINGS

Examples of embodiments herein are described in more detail with reference to attached drawings in which:

FIG. 6 is a block diagram depicting a mobile device according to embodiments herein.

DETAILED DESCRIPTION

In the following, a detailed description of the exemplary embodiments is described in conjunction with the drawings, in several scenarios to enable easier understanding of the solution(s) described herein.

In general, the embodiments herein relating to a process of activation of a mobile subscription using eSIM of a mobile device. The mobile device may be a smartphone or a computer with wireless connectivity or any device that support eSIM.

Figure 1:
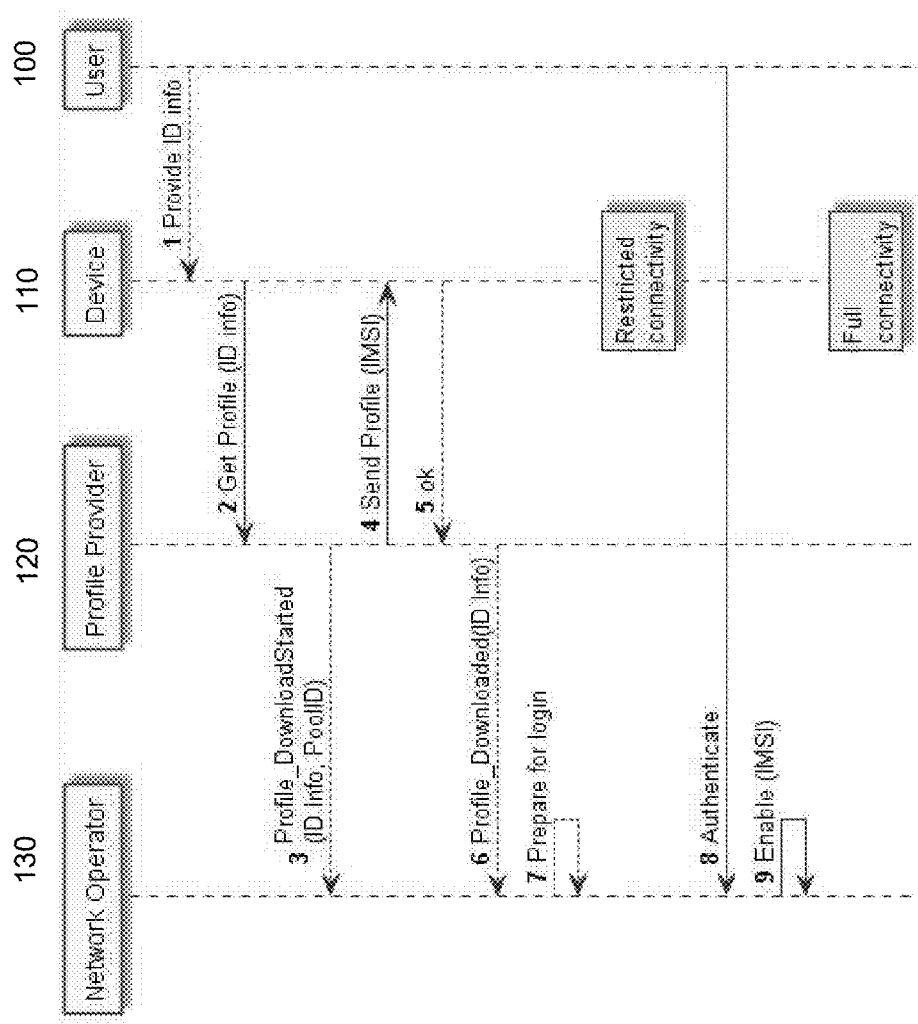
FIG. 1 is a signaling diagram depicting a mobile subscription activation process according to an embodiment herein.

Referring to FIG. 1 there is illustrated a signalling diagram describing the mobile subscription activation process according to some exemplary embodiments of the present invention.

In the Figure there is shown a user 100, a mobile device 110, a profile provider 120, and a network node (not shown) belonging to a network operator 130. The profile provider 120 may be part of the network server of the operator 130 or may be separate entity. The profile provider 120 (or if part of the network operator) 120 manages a pool of SIM profiles, each including, an IMSI. It should be mentioned that profile provider generally includes the function of a network element known as SM-DP+ (Subscription Manager Data Preparation-enhanced) which is responsible for the creation, generation, management and the protection of resulting subscriber profiles at the input/request of the operator or network provider. The network operator or network node herein may thus include SM-DP or SM-DP+ functionality.

As shown in FIG. 1, an identification (ID) information is received (Action 1, 2) from mobile device 110, at the profile provider 120. ID information comprises information included in a Quick Response (QR) code, a Near Field Communication (NFC) tag, a EID code, or in a Unified Resource Locator (URL). The ID information may be retrieved by the user 100 by entering the SIM menu and scan the activation QR code of the mobile device 110.

The ID information is then used to get or retrieve a SIM profile from a pool of SIM profiles. The network device of the network operator 130 may be provided with the pool ID and the ID information (Action 3). A SIM profile including the IMSI and security and/or network keys are transmitted to the mobile device 110 (Action 4). An acknowledgement (Action 5) of such reception is sent from the mobile device 110 to the profile provider 120 or to the network node 130. Since the network node has information that the SIM profile has been downloaded (Action 6) or sent to the mobile device, the network node 130 prepares (Action 7) for login by the mobile device. A connection with the mobile device is established, wherein the connection is restricted until the IMSI has been associated to a subscription.

The connection, for the given IMSI, is enabled based on the subscription that is linked to the IMSI. It should be noted that the subscription can be new, or it can be pre-existing. The user authenticates to the network node using login information (Action 8) and, provided, the authentication is successful, the IMSI is enabled/activated (Action 9) and the mobile subscription for the given IMSI, is activated, based on associated data or based on the IMSI relating to said subscription. A successful activation enable the user of the mobile device to have full connectivity.

According to an embodiment, the user of the device may login using credentials to be entered in an activation site of the network operator. In this case the user is an existing customer. According to another embodiment, the IMSI may be activated based on a confirmation message sent to the user's main subscription from the network node, such a confirmation may a SMS. According to another embodiment, the IMSI may be activated based on a company admin accepting the user to the company subscription. If the user or mobile device is a new customer, associated data e.g. including at least registration information are provided by the user to the network operator. Also, payment details are provided. Hence, according to an embodiment, associated data may include login information for activation of the subscription or at least registration information.

According to another embodiment, if the network device of the operator receives the same ID information from the same mobile device or from another mobile device, the network device allocates a new SIM profile from the same pool of SIM profiles managed by the profile provider. Thus, a unique ID information (e.g. the QR code) may be mapped to different SIM profiles from the same pool.

The allocated IMSI profile may further include at least one PIN code that the mobile device or user can use after successful activation of the mobile subscription. The PIN code may be allocated to the mobile device after activation of the IMSI.

Figure 2:
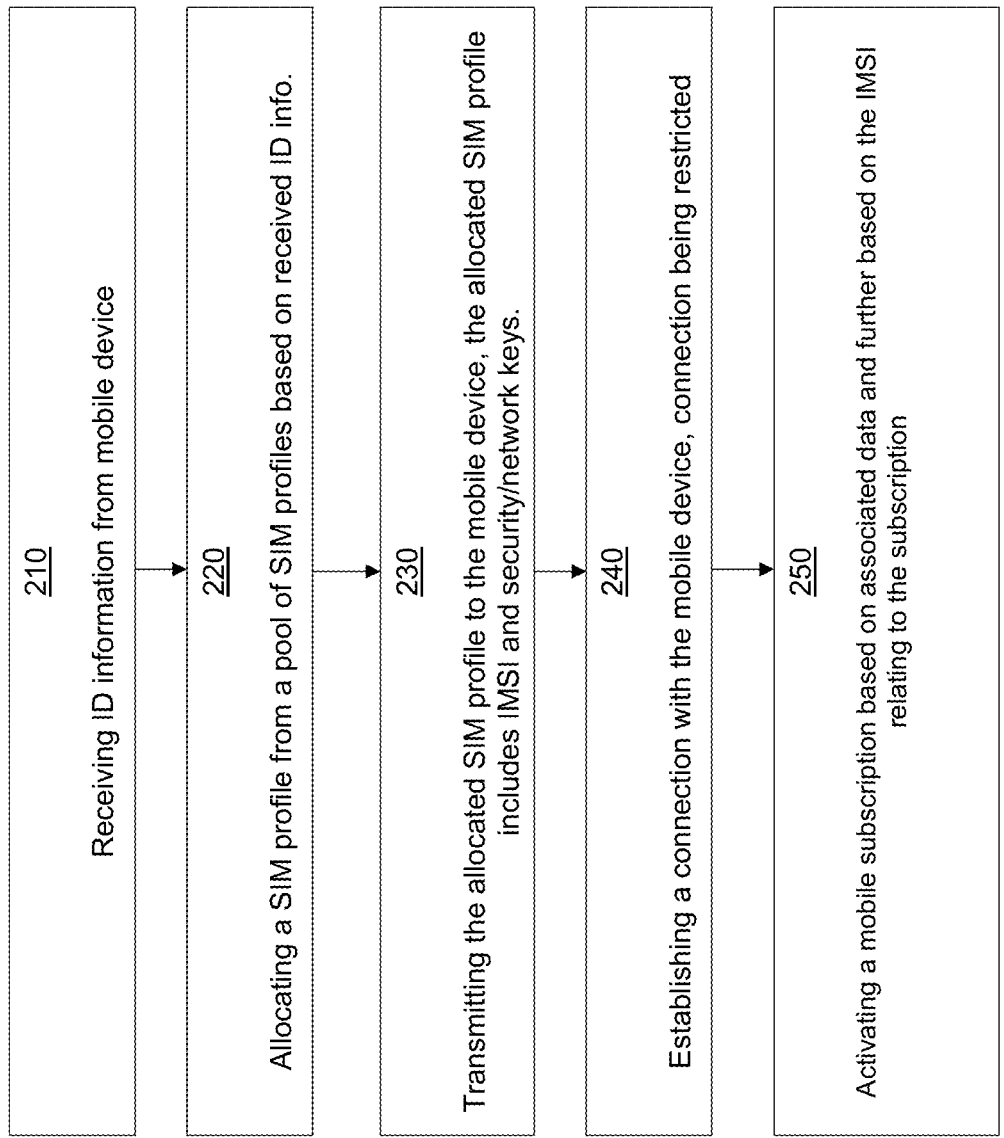
FIG. 2 depicts a flowchart of a method performed by a network node according to an exemplary embodiment.

Referring to FIG. 2, there is illustrated the main steps of the method for activation of a mobile subscription of a mobile device according to the embodiments described above.

Figure 3:
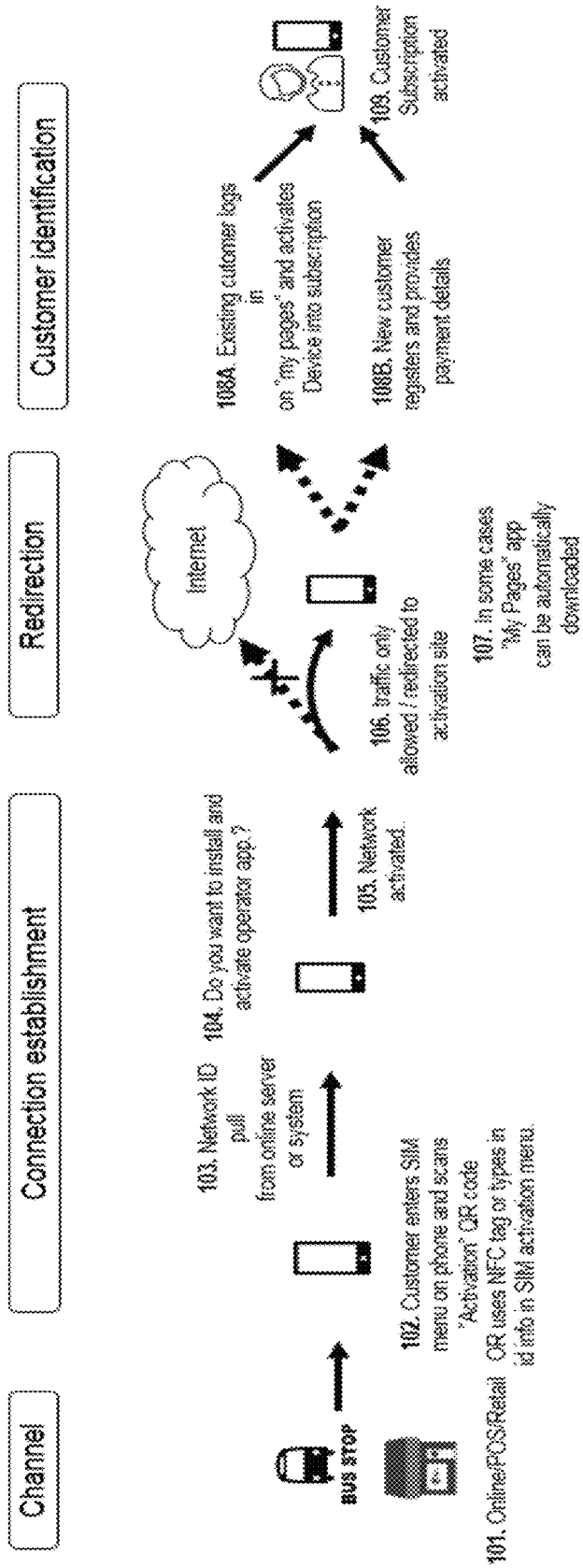
FIG. 3 illustrates an example of a mobile/subscription activation process according to an exemplary embodiment herein.

The method comprising: receiving (210), at a network node, an identification information from the mobile device; allocating (220), based on the received identification information, a subscriber identity module, SIM, profile from a pool of SIM profiles managed by the network node or by a profile provider; transmitting (230) the allocated SIM profile to the mobile device; the SIM profile including at least an international mobile subscriber identity, IMSI, and associated network keys; establishing (240) a connection with the mobile device, wherein the connection is restricted until the IMSI has been associated to a subscription; and activating (250) the mobile subscription for the given IMSI based on associated data or based on the IMSI relating to said subscription Referring to FIG. 3, there is illustrated an example of an activation process according to exemplary embodiments herein.

A user of a mobile device desiring a subscription may enter (102) SIM menu on phone/device and scans an "Activation" QR code or uses a NFT tag or types in eID information in the SIM activation menu of the device. A personal activation code in physical form may also be used to retrieve the ID information. URL may also be used, enabling the user to click on the URL to provide the ID information to the network operator (or server). The desired subscription information may be provided via a channel (101) such as a retail or point of sale, online etc. The ID information is used to pull (103) from the network node or from a server or a profile provider a SIM profile (including IMSI and network/security keys) from a pool of profiles. The user may be requested to download and install an application of the operator (104). As previously described, when a network establishment is performed/activated (105), the traffic from the user is restricted or redirected to the activation site of the operator (106). This connection is restricted until the IMSI has been associated to a subscription. If the user/customer is an existing customer, an application ("My pages app.") associated with the customer maybe automatically downloaded (107). The existing customer logs in "My pages" and activates the device into the subscription (108A). Alternatively, the customer/user receives a confirmation SMS to a main subscription to approve addition of the device/subscription. If it is a new customer (108B), the new customer is requested to provide registration information and payment details. When the customer subscription is successfully activated (109), the customer gets full connectivity.

Figure 4:
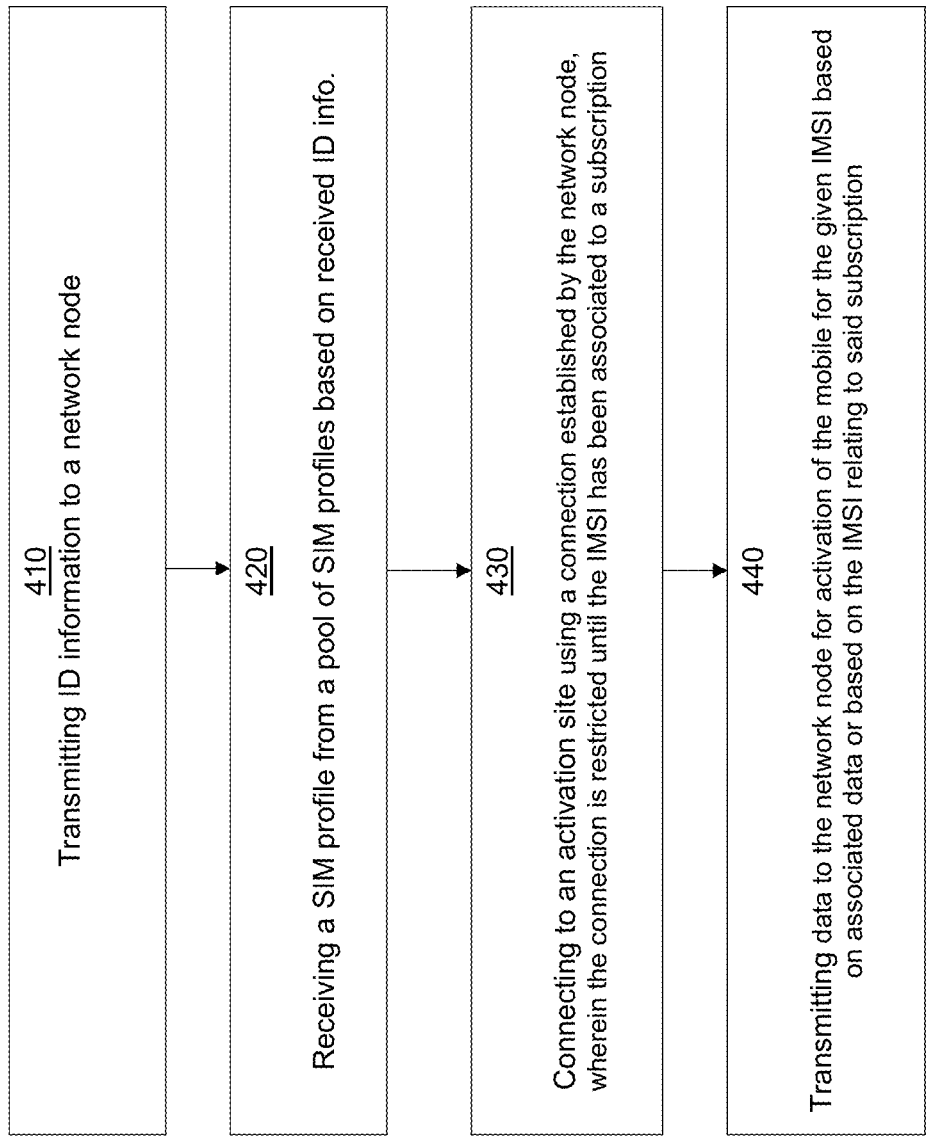
FIG. 4 illustrates a flowchart of a method performed by a mobile terminal according to an exemplary embodiment.

Referring to FIG. 4, there is illustrated a flowchart of a method performed by a mobile device according to embodiments herein. As shown the method comprises: transmitting (410) to a network node, ID information; receiving (420) from the network node and based on the ID information a SIM profile allocated by the network device or a profile provider, the SIM profile including at least an IMSI and network keys (for the establishment of the connection); connecting (430) to at least one activation site (e.g. "My pages" or a registration site) of the network node using a connection established by the network node, wherein the connection is restricted until the IMSI has been associated to a subscription; transmitting (440) data to the network node for activation of the mobile for the given IMSI based on associated data or based on the IMSI relating to said subscription.

According to an embodiment, the data associated include login information for activating the mobile subscription or at least registration information for activating the mobile subscription.

As previously described the identification information comprises information included in a Quick Response, QR, code, or a Near Field Communication, NFC, tag, or a EID (or eID) code or a URL. It may further include at least one PIN code.

Figure 5A:
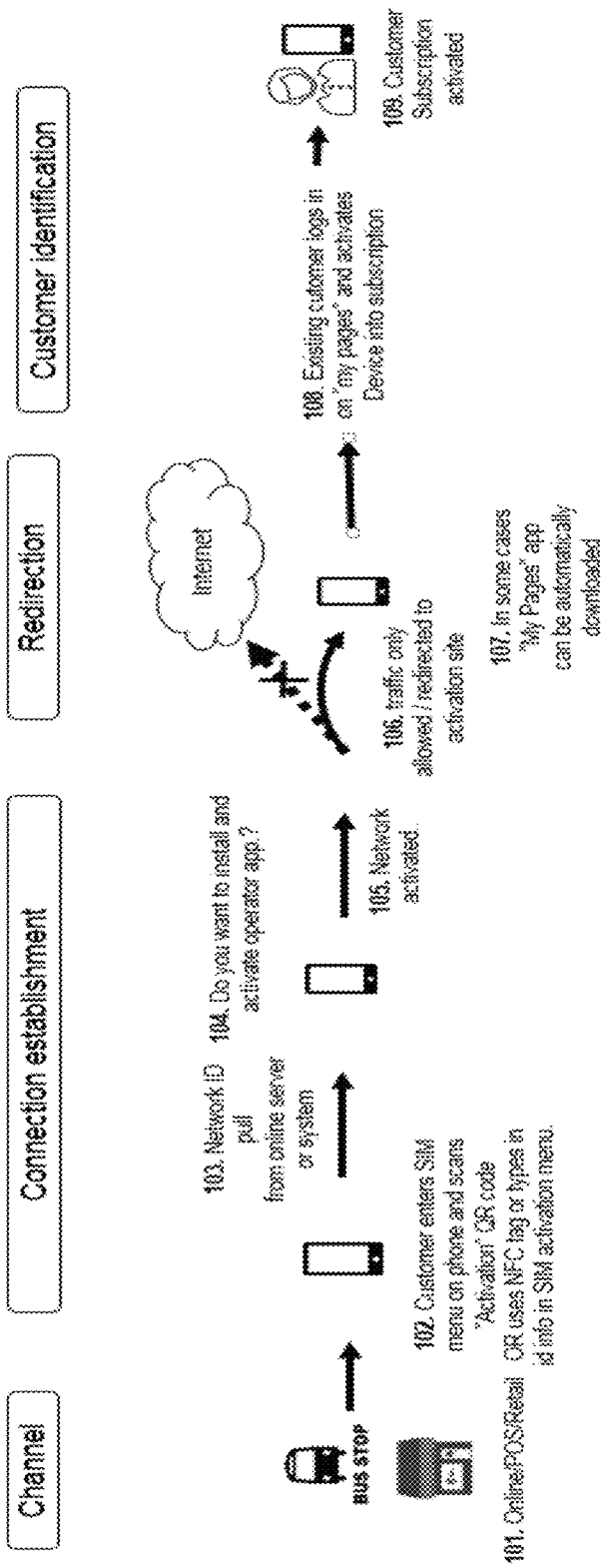
FIG. 5A-5B illustrate other examples of a mobile/subscription activation process according to exemplary embodiments herein.

FIG. 5A illustrates an example of an activation process where the user is a pre-existing subscriber. Similarly to process depicted in FIG. 3, the customer logs in into "My Pages" and activate the subscription (108A).

Figure 5B:
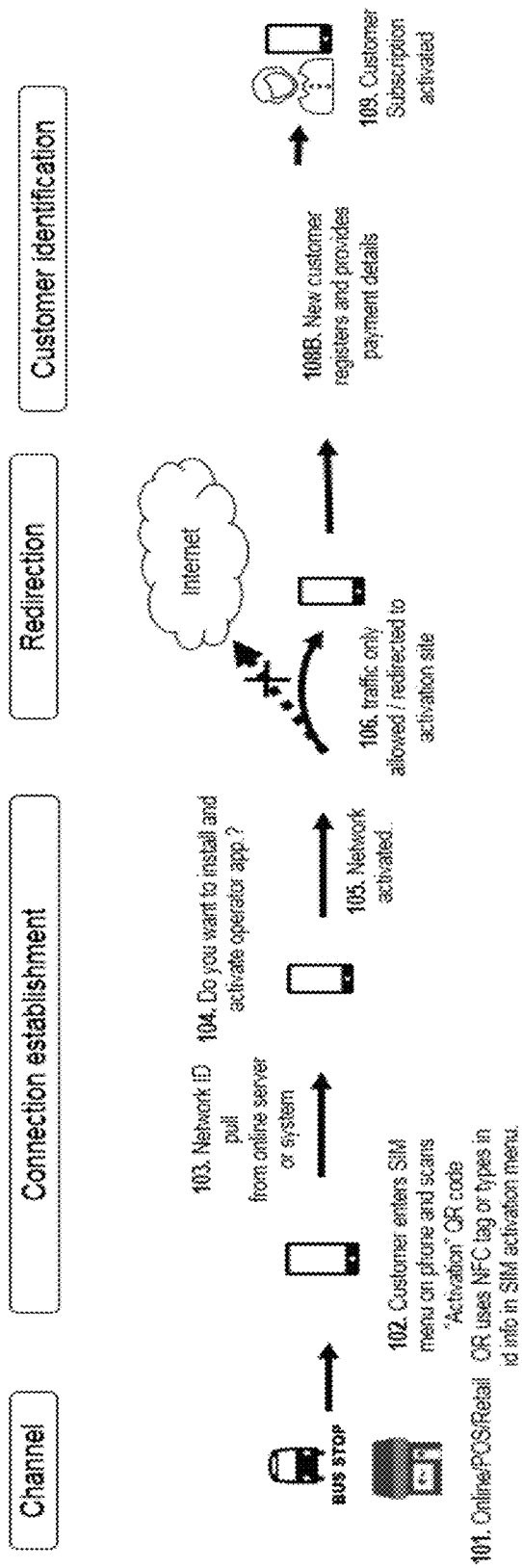

FIG. 5B illustrates another example of an activation process where the user is a new customer. In this scenario, the new customer is requested to provide registration information and provide payment details (108B).

To perform the method or procedure steps/actions described herein, a mobile device 600 is provided as depicted in FIG. 6. The mobile device 600 comprises a processing circuit or a processing module or a processor or means 610, antenna circuitry (not shown); a receiver circuit or receiver module 620; a transmitter circuit or transmitter module 630; a memory module 640 and a transceiver circuit or transceiver module 650 which may include the transmitter circuit 630 and the receiver circuit 620.

The mobile device may be a wireless device, a wireless terminal, a mobile station, a mobile telephone, a cellular telephone, or a smart phone. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, just to mention some examples. The mobile device 600 is also here considered eSIM capable.

The processing module/circuit 610 includes a processor, microprocessor, an application specific integrated circuit (ASIC), field programmable gate array (FPGA), or the like, and may be referred to as the "processor 610." The processor 610 controls the operation of the mobile device 600 and its components. Memory (circuit or module) 640 includes a random access memory (RAM), a read only memory (ROM), and/or another type of memory to store data and instructions that may be used by processor 610. In general, it will be understood that the mobile device 600 in one or more embodiments includes fixed or programmed circuitry that is configured to carry out the operations in any of the embodiments disclosed herein.

In at least one such example, the mobile device 600 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the mobile device operations disclosed herein. Further, it will be appreciated that the mobile device 400 may comprise additional components not shown in FIG. 6.

According to embodiments herein, the memory 620 contains instructions executable by the processor 610 whereby said mobile device 600 is operative to: transmit to a network node, identification information; receiving from the network node and based on the identification information a SIM profile allocated by the network device or a profile provider, the SIM profile including at least an international mobile subscriber identity, IMSI and network keys; connect to at least one activation site of the network node using a connection established by the network node, wherein the connection is restricted until the IMSI has been associated to a subscription; and transmit data to the network node for activation of the mobile for the given IMSI based on associated data or based on the IMSI relating to said subscription.

As previously described the transmitted data include login information for activating the mobile subscription or at least registration information for activating the mobile subscription, and wherein the connection is restricted to at least one activation site of the network node. The transmitted identification information comprises information included in a Quick Response, QR, code, or a Near Field Communication, NFC, tag or a EID (or eID) code or a URL. The mobile device 600 is further operative to receive from the network node at least one PIN code allocated by the network device. The PIN codes are included in the SIM profile.

Additional details regarding the functions of the mobile device have been already disclosed and need not be repeated.

There is also provided a computer program comprising instructions which when executed on at least one processor 610 of the mobile device 600 according to anyone of claims 6-7, cause the at least said one processor 610 to carry out the method according to anyone of claims 13-16.

Figure 7:
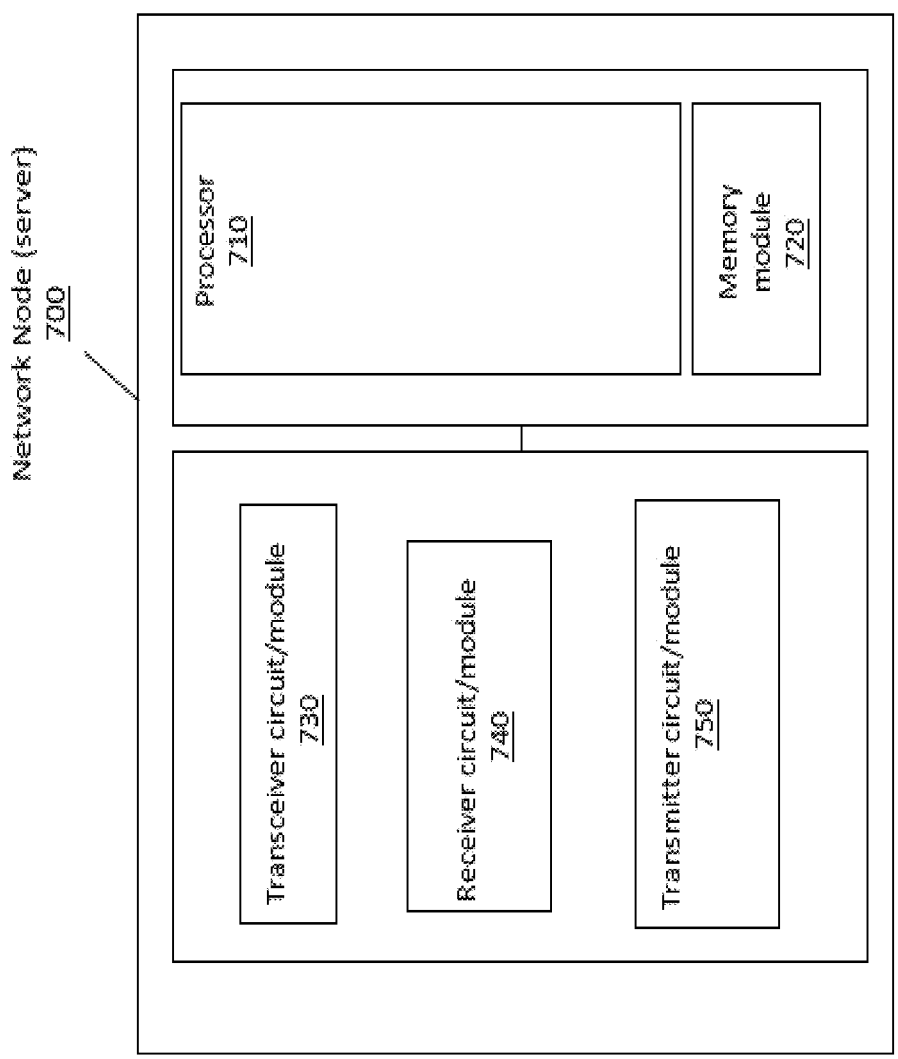
FIG. 7 is a block diagram depicting a network node according to embodiments herein.

To perform the method or procedure steps/actions described herein, a network node (server) 700 is provided as exemplified in FIG. 7. The network node 700 comprises a processing circuit or a processing module or a processor or means 710, antenna circuitry (not shown); a receiver circuit or receiver module 720; a transmitter circuit or transmitter module 730; a memory module 740 and a transceiver circuit or transceiver module 750 which may include the transmitter circuit 730 and the receiver circuit 720. The network node 700 may include additional components not shown in the figure.

As previously embodiments herein, memory 720 contains instructions executable by said processor 710 whereby the network node 700 is operative to: receive identification information from the mobile device; allocate, based on the received identification information, a SIM, profile from a pool of SIM profiles managed by the network node or by a profile provider; transmit the allocated SIM profile to the mobile device; the SIM profile including at least an IMSI and network keys; establish a connection with the mobile device, wherein the connection is restricted until the IMSI has been associated to a subscription; and activate the mobile subscription for the given IMSI based on associated data or based on the IMSI relating to said subscription.

According to an embodiment, the connection with the mobile device is restricted to at least one selected site used for activation. The received ID information from the mobile device comprises information included in a Quick Response, QR, code, or a Near Field Communication, NFC, tag, or a EID code or a URL. The network node 700 is further operative to allocate a new SIM profile from the same pool of SIM profiles, if the same identification information is received from another mobile device or the same mobile device. Furthermore, the network node 700 may allocate at least one PIN code for the mobile device.

Additional details relating to the functionality or actions performed by the network node have already been disclosed.

There is also provided a computer program comprising instructions which when executed on at least one processor 710 of the network node 700 according to anyone of claims 8-12, cause the processor 710 to carry out the method according to anyone claims 1-5.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, LTE-A (or LTE-Advanced), 5G, UMTS, WiMAX and WiFi.

The invention claimed is:

1. A method for activating a mobile subscription for a mobile device, the method comprising:
   receiving, at a network node, an identification information from the mobile device;
   allocating, based on the received identification information, a subscriber identity module, SIM, profile from a pool of SIM profiles managed by the network node or by a profile provider;
   transmitting the allocated SIM profile to the mobile device, the SIM profile including at least an international mobile subscriber identity, IMSI, and associated network keys;
   establishing a connection with the mobile device, wherein the connection is restricted until the IMSI has been associated to a subscription; and
   activating the mobile subscription for the given IMSI based on associated data or based on the IMSI relating to said subscription, wherein if the network node receives the same identification information from the same or from another mobile device, the network node allocates a new SIM profile from the same pool of SIM profiles.

2. The method according to claim 1 wherein the connection with the mobile device is restricted to at least one selected site used for activation.

3. The method according to claim 1 wherein the associated data includes login information for activating the mobile subscription or at least registration information for activating the mobile subscription.

4. The method according to claim 1 wherein the received identification information from the mobile device comprises information included in a Quick Response, QR, code, a Near Field Communication, NFC, tag, or an eID code, or in a Unified Resource Locator, URL.

5. A method performed by a mobile device for activating a mobile subscription, the method comprising:
   transmitting to a network node, identification information;
   receiving from the network node and based on the identification information, a SIM profile allocated by the network node or a profile provider from a pool of SIM profiles, the SIM profile including at least an international mobile subscriber identity, IMSI, and network keys;
   connecting to at least one activation site of the network node using a connection established by the network node, wherein the connection is restricted until the IMSI has been associated to a subscription; and
   transmitting data to the network node for activation of the mobile subscription for the given IMSI based on associated data or based on the IMSI relating to said subscription, wherein if the network node receives the same identification information from the same or from another mobile device, the network node allocates a new SIM profile from the same pool of SIM profiles.

6. The method according to claim 5 wherein the associated data includes login information for activating the mobile subscription or at least registration information for activating the mobile subscription.

7. A network node for activating a mobile subscription for a mobile device, the network node comprising a processor and a memory, said memory containing instructions executable by said processor whereby said network node is operative to:
   receive identification information from the mobile device;
   allocate, based on the received identification information, a subscriber identity module, SIM, profile from a pool of SIM profiles managed by the network node or by a profile provider;
   transmit the allocated SIM profile to the mobile device, the SIM profile including at least an international mobile subscriber identity, IMSI, and associated network keys;
   establish a connection with the mobile device, wherein the connection is restricted until the IMSI has been associated to a subscription;

activate the mobile subscription for the given IMSI based on associated data or based on the IMSI relating to said subscription; and allocate a new SIM profile from the same pool of SIM profiles, if the same identification information is received from another mobile device or the same mobile device.

8. The network node according to claim 7 wherein the connection with the mobile device is restricted to at least one selected site used for activation.

9. The network node according to claim 7 wherein the received identification information from the mobile device comprises information included in a Quick Response, QR, code, or a Near Field Communication, NFC, tag, or a EID code or URL.

10. The network node according to claim 7 is operative to allocate, for the mobile device, at least Personal Identification Number, PIN, codes.

11. A mobile device for activating a mobile subscription, the mobile device comprising a processor and a memory, said memory containing instructions executable by said processor whereby said mobile device is operative to:
   transmit to a network node, identification information;
   receiving from the network node and based on the identification information, a SIM profile allocated by the network device or a profile provider from a pool of SIM profiles, the SIM profile including at least an international mobile subscriber identity, IMSI, and network keys;

connect to at least one activation site of the network node using a connection established by the network node, wherein the connection is restricted until the IMSI has been associated to a subscription; and transmit data to the network node for activation of the mobile for the given IMSI based on associated data or based on the IMSI relating to said subscription, wherein if the network node receives the same identification information from the same or from another mobile device, the network node allocates a new SIM profile from the same pool of SIM profiles.

12. The mobile device according to claim 11 wherein the transmitted data includes login information for activating the mobile subscription or at least registration information for activating the mobile subscription, and wherein the connection is restricted to an activation site of the network node.

13. The mobile device according to claim 11 wherein the transmitted identification information comprises information included in a Quick Response, QR, code, or a Near Field Communication, NFC, tag or a EID code or a URL.

14. The mobile device according to claim 11 is further operative to receive from the network node at least Personal Identification Number, PIN, codes allocated by the network node, which PIN code(s) are included in the allocated SIM profile.

* * * * *